United States Patent [19]

Kurata et al.

[11] 4,059,421

[45] Nov. 22, 1977

[54] CROSS-FLOW TYPE STRIPPING-ABSORPTION APPARATUS

[75] Inventors: Shigehiro Kurata, Ichinomiya; Kenzo Abe, Ohtaki, both of Japan

[73] Assignee: United Resources Industry Co., Ltd., Tokyo, Japan

[21] Appl. No.: 699,806

[22] Filed: June 25, 1976

[30] Foreign Application Priority Data

Sept. 2, 1975 Japan .................................. 50-105656

[51] Int. Cl.² ............................................ B01D 53/14
[52] U.S. Cl. ......................................... 55/196; 55/70; 55/71; 55/89; 261/118
[58] Field of Search ................. 55/46, 48, 51, 53, 185, 55/196, 71, 70, 89; 261/118, DIG. 11

[56] References Cited

U.S. PATENT DOCUMENTS

| | | | |
|---|---|---|---|
| 1,897,031 | 2/1933 | Chamberlain | 55/71 X |
| 2,520,947 | 9/1950 | Matuszak | 55/71 X |
| 3,232,027 | 2/1966 | Lorenz et al. | 55/48 X |
| 3,655,171 | 4/1972 | Miller, Jr. | 261/118 X |
| 3,690,040 | 9/1970 | Halfon | 55/46 |
| 3,754,376 | 8/1973 | Kent | 55/51 |
| 3,785,121 | 1/1974 | Phelps | 55/196 X |
| 3,819,813 | 6/1974 | Jones, Jr. et al. | 261/118 X |
| 3,854,901 | 12/1974 | Cowley | 55/51 |
| 3,944,402 | 3/1976 | Cheremisinoff | 261/118 X |
| 3,964,980 | 6/1976 | Ozero | 55/51 X |

Primary Examiner—Charles N. Hart
Assistant Examiner—Robert H. Spitzer
Attorney, Agent, or Firm—Wenderoth, Lind & Ponack

[57] ABSTRACT

A novel apparatus for stripping and absorption of useful gases and vapors and/or averse gases and vapors, which comprises a unit consisting of
a. a stripping part for the aforementioned gases and vapors in which an inert gas is contacted in a cross-flow with the solution containing said gases and vapors, and
b. an absorption part for the gases and vapors in which the resulting inert gas containing the gases and vapors is contacted in a cross-flow with a liquid absorbent or a combination of the units arranged in a series, thereby providing high efficiency of stripping and absorption of the gases and vapors as well as low operation costs.

4 Claims, 2 Drawing Figures

CROSS-FLOW TYPE STRIPPING-ABSORPTION APPARATUS

This invention relates to an apparatus for gas-stripping and gas-absorption having a novel construction. Paticularly, this invention relates to a stripping-absorption apparatus, characterized in that a liquid dissolving useful gases or vapors and/or averse gases or vapors (hereinafter referred to the useful gases) is subjected to a gas-liquid contact with an incondensable gas which is inert to said solution (hereinafter referred to the inert gas). The useful gases are stripped from said liquid to said inert gas phase, and the resulting inert gas containing the useful gases is subjected to a gas-liquid contact with a suitable liquid absorbent to absorb the useful gases. More particularly, this invention relates to a multistage stripping-absorption apparatus which can circulate the inert gas after the aforementioned absorption to the subsequent stripping-absorption operation. Finally, the inert gas is used repeatedly.

The conventional stripping-absorption apparatus, generally, have a construction wherein a flow of liquid and a flow of gas are contacted with each other in a counter-flow system or concurrent-flow system to accomplish the gas stripping and/or gas-absorption. Such apparatus generally consist of a single combination of a stripping part and an absorption part, and the inert gas circulates in the apparatus.

In such a conventional stripping-absorption apparatus of a counter-flow or concurrent-flow system, it is a common view that there is generally needed an increase in the height of the apparatus column for efficiently carrying out the stripping and absorption.

With the increase in the height of a column, however, there are a number of drawbacks. For example, the cost of construction increases proportionally and the power costs, etc. increase due to the increase in pressure drop and pumping head for sprinkling. Also, it is required that a high efficient demister and a chimney tray be provided in order to operate the apparatus efficiently. The pressure drop in the column extremely increases due to such supplementary equipment.

We have invented cross-flow type stripping-absorption apparatus of a single-stage and also of a multi-stage system in order to eliminate these drawbacks.

The main part of the apparatus of the invention consists of a gas-stripping part and a gas-absorption part which are arranged in a series horizontal to each other. Both parts have the same construction and are preferably charged with packings.

The practice of the apparatus is as follows:

A solution containing the useful gases is flowed down from the top of said gas-stripping part. On the other hand, the inert gas is introduced horizontally from the side or the flank of the gas-stripping part, and subjected to a gas-liquid contact with the above mentioned solution in a cross-flow manner, so that the useful gases in said solution may be transferred to the inert gas phase.

Said inert gas containing the useful gases is then introduced into the gas-absorption part which arranged subsequent to said gas-stripping part, wherein the inert gas is again contacted in cross-flow manner, with the liquid absorbent which is flowed down from the top of gas-absorption part, so that the useful gases in the inert gas may be transfered to the phase of the liquid absorbent. The purified inert gas is preferably circulated to said gas-stripping part.

Employing this apparatus, the following advantages may be obtained:

The gas-liquid equilibrium relation can be kept more suitably when the stripping and the absorption are carried out efficiently, as compared with that case of a concurrent-flow system; there is very little pressure drop is generated by blowing the gas against the liquid flow as in the case of a counter-flow, and consequently the power cost is reduced; the cross-section area of the connection part between the gas-stripping and the gas-absorption is so wide that there is very little pressure drop, and of use a high efficient demister, chimney tray, etc. is not required. Consequently, the power cost is diminished.

Furthermore, it should be noted that the advantage of this apparatus is that it to provide a multi-stage stripping-absorption apparatus wherein two or more units combining a gas-stripping and a gas-absorption part (said combination is, hereinafter, referred to as the stripping-absorption unit) are arranged successively in a series.

The multi-stage cross-flow stripping-absorption apparatus in this invention is illustrated below with reference to the drawings attached herein. In the drawings, for example, there is shown for explanation a six-staged apparatus. However, the number of stages may optionally be varied depending on the operational conditions, such as the concentration of the useful gases, the of gas-liquid equilibrium, amount of the liquid to be treated, etc.

Figure 1:
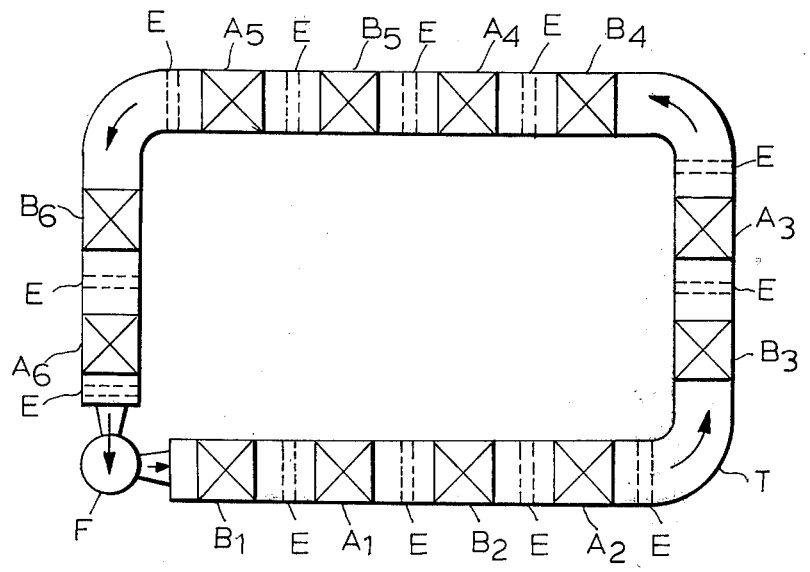
FIG. 1 is a plane view which illustrates an embodiment of the apparatus of this invention.

As shown in FIG. 1, the gas-stripping parts $B_1$ to $B_6$ consisting of packed layers and the gas-absorption parts $A_1$ to $A_6$ also consisting of packed layers are alternately arranged with the direction of flow of the inert gas (indicated by the arrow), the layers being charged with packings. E shows entrainment separation in which an eliminator and the like, if necessary, may be used between the respective stripping and absorption parts.

An optimum amount of the inert gas, such as air, is run by blower F into apparatus T as a horizontal flow indicated by the arrow, and is consequently passed through each stripping-absorption unit, into the last unit consisting of $B_6$ and $A_6$, and then circulated to the blower F to be used again. Thus, the inert gas is regenerated and revived to a fresh inert gas after the stripping-absorption step of the useful gases, and is recirculated.

Figure 2:
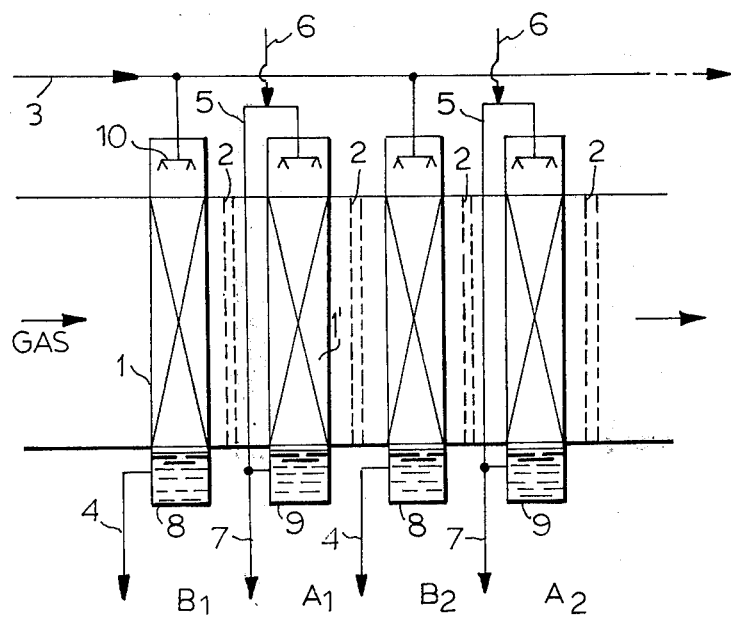
FIG. 2 is a side view which shows a longitudinal section of a part of the apparatus, and illustrates the respective flows of the liquid containing the useful gases, and the inert gas.

As shown in FIG. 2, the liquid containing the useful gases is passed through pipe 3 at the rate of $L_B(m^3/H)$, and distributed to the top of each of the stripping parts $B_1$ to $B_6$ in a separated uniform flow. Each of separated flows of the liquid is sprinkled down uniformly onto packed layer 1 by sprinkler 10 at the rate of $L_{B1}$ to $L_{B6}$ ($m^3/H$), respectively. On the other hand, the inert gas is flowed horizontally into the apparatus of this invention in the direction of the arrow at the rate of G ($m^3/H$) and passed into the gas-stripping part $B_1$ of the first stripping-absorption unit and subjected to the gas-liquid contact in a cross-flow with the aforementioned sprinkled liquid in the packing layer 1 in $B_1$ at the rate of $L_{B-1}$($m^3/H$) whereby the useful gases are stripped from the liquid to the inert gas phase. After the useful gases are stripped, the liquid is discharged out of pit 8 through pipe 4. The inert gas containing the useful gases passes through the stripping part $B_1$ and its entrainment is eliminated by eliminator 2 and then runs to the next gas absorption part $A_1$ which also contains the packed layer 1 as that in the stripping part $B_1$. Liquid absorbent is pumped up through pipe 5 from pit 9 at the bottom of the absorption part $A_1$ and is sprinkled down at the rate of $L_{A-1}$ ($m^3$/H) from the top of the absorption part $A_1$ onto packed layer 1'. It is preferable to supplement a fresh absorbent into the liquid absorbent through pipe 6 continuously or when required, and to discharge a part of the liquid through pipe 7.

The inert gas is subjected to gas-liquid contact with the liquid in cross-flow in the packed layer 1' to remove the useful gases by the absorption of the liquid and to regenerate to the fresh gas and its entrainment is eliminated. Then, it is passed to the second stripping-absorption unit $B_2$ - $A_2$ wherein the gas is again subjected to the same operation as in the first unit followed by repeating the operation in the third stripping-absorption unit $B_3$ - $A_3$ to the sixth stripping-absorption unit $B_6$ 14 $A_6$ and finally circulating it the first unit by use of the blower.

It should be noted that a multi-stage apparatus of this invention can easily increase or decrease the number of stages according to demand. Thus, when it is required to increase or decrease the number of units, the desired number may be added or substracted in a series. In this case, case the operational charges can be saved for the unoperated units. On the other hand, in the case of the conventional counter-flow or concurrent-flow system, the height of column must be increased or decreased for the above mentioned purpose. This is more difficult work than in the case of the present apparatus. Thus, the apparatus of this invention has advantages in that the number of units can be easily increased or decreased to operate under conditions adapted for the load, whereby the operational costs can be reduced.

Additionally, the multi-stage apparatus of this invention can be applied as a plural-unit system, combining two or more units to one another. Namely, the solution which has been treated in the gas-stripping part $B_1$ in FIGS. 1 and 2 is circulated to the top of the gas-stripping part $B_2$, so as to strip the useful gases. Thus, the liquid may be used repeatedly. The rate of gas-stripping may be highly increased by employing this system.

In the multi-stage apparatus of this invention, the inert gas can be circulated to re-use by repeating the stripping procedure and absorption procedure at the respective stripping-absorption unit. This apparatus therefore has an advantage in that the volume of the inert gas can be reduced so as to be much smaller than that used in a single unit of the conventional type. Thus, the rate of gas-stripping is increased, depending on the increase of the gas-liquid ratio represented by the following equation:

$$\text{Ratio of gas-liquid} = \frac{\text{Rate of inert gas } [\frac{m^3}{H}]}{\text{Rate of the solution } [\frac{m^3}{H}]} = \frac{G}{L}$$

provided that the conditions of operation, such as the temperature of the solution, the concentration of the useful gases, the temperature of the inert gas, the volume load of the packed layer $$\text{Volume load} = \frac{\text{Flow of the solution } [\frac{m^3}{H}]}{\text{Volume of the packing } [m^3]}$$

and the like are the same in each unit. When the rate of the solutions divided uniformly into each stripping part are indicated by $L_{B-1}$, $L_{B-2}$, - and $L_{B-6}$ [$m^3$/H] respectively, they may be shown as follows:

$$L_{B-1} = L_{B-2} = - L_{B-6} = L_B/6 \, [m^3/H]$$

Therefore, the ratio of gas-liquid at the respective stripping-part ($G/L_{B-i}$, wherein $i = 1 - 6$) may be shown as follows:

$$\frac{G}{L_{B-i}} (i = 1 - 6) = \frac{G}{L_{B-1}} = \frac{G}{L_{B-2}} = \frac{G}{L_{B-6}} = \frac{\frac{G}{L_B}}{6} = 6\frac{G}{L_B}$$

As can be seen from the above equations of the six unit type, six times the ratio of gas-liquid is obtained, as compared with the single unit type. Thus, when multistage stripping apparatus, for example, "n" state apparatus is used, there can be obtained an "n" times ratio of gas-liquid as compared with that of a single unit type. That is to say, if one employs a more are higher the number of stages, the rate of gas-stripping obtained by a blower of a smaller capacity is higher, whereby the power cost may be reduced.

In order to apply said equations in equipment, it is required that almost 100% of the useful gases stripped into the inert gas at the stripping part be absorbed to the liquid absorbent at the next absorption part. Also, it is required that the inert gas passed through the absorption part be regenerated to the fresh inert gas free of the useful gases, and that the pressure drop of the entire apparatus is as small as possible.

Said problems may be sufficiently and easily eliminated by employing a non-volatile absorbent which has a high capacity of absorption; charged packings which have a high efficiency of gas-liquid contact and a small pressure drop; providing on the entrainment separator, for example, an eliminator between the stripping part and the absorption part to separate entrainment and; using a liquid service means which can sprinkle the liquid uniformly onto the packing layer. Further, the liquid must be sprinkled uniformly on the packing layers and a suitable sprinkler must be used so that the size of the sprinkled liquid drops will not be too small.

As the inert gas to be used in this apparatus, there may be used any of the non-condensable gases which are inactive to the solution containing the useful gases. Air may be used generally. For this purpose, carbon dioxide may also be used.

As the packings to be used in the gas-stripping part and also in the gas-absorption part of this apparatus, there may be used conventional packings, such as the packings for a cooling tower.

On the stripping-absorption treatment, there are two types of gases and vapors dissolved in the solution. One of them such as chlorine, carbon dioxide and the like is stripped effectively into the inert gas phase from the liquid a lower ratio of gas-liquid. But another type, such as iodine, bromine, ammonia and the like requires a higher ratio of gas-liquid to be sufficiently stripped. In order to treat the latter gas, good results are obtained by using this apparatus. Above all, this apparatus has a good effect on the recovery of iodine, bromine and other useful gases and also on elimination of ammonia, phenol and other averse gases. Therefore, this apparatus may be widely applied for the recovery or elimination of the above-mentioned materials and to reduce the costs of a stripping-absorption treatment.

What is claimed is:

1. A multi-stage cross-flow type stripping-absorption apparatus for recovery of at least one gas component from a solution containing said gas component which comprises (I) two or more of stripping-absorption units consisting of
    a. a stripping part for removing the gas component; an inlet for the solution equipped at the top of said stripping part; an outlet at the bottom of said stripper part; an intermediate section between said inlet and outlet which forms a gas-liquid contacting zone; an inlet for an inert gas provided in the front side of said zone and an outlet in the rear side, so that the solution is contacted with the inert gas in a cross-flow system, and
    b. an absorption part connected to and in series with said stripper part for removing the gas component; an inlet for introduction of a liquid absorbent equipped at the top of said absorption part; an outlet at the bottom thereof; an intermediate section between said inlet and outlet which forms a gas-liquid contacting zone; an inlet in the front side of said zone for the inert gas containing said gas component removed from the stripper part and connected to the gas outlet of the stripper part and an outlet in the rear side of said zone so that the liquid is contacted with said inert gas and gas component from the stripping part in a cross-flow system, said stripping part and absorbing part alternately arranged and in series so as to form a multi-stage system;

II. at least one blower for circulating the inert gas from the first unit to the following units in turn, and then finally again to said first unit, which blower is placed in a duct as defined in (III) below, and III. a horizontal duct for connecting the units (I) and the blower (II) arranged in series in the direction of the inert gas, to form a closed circuit system such that the inert gas may be recirculated throughout the apparatus after the gas component is removed therefrom by contact with liquid absorbent in the absorption parts of unit (I).

2. The apparatus according to claim 1, wherein said inert gas is selected from the group consisting of air, carbon dioxide and mixtures thereof.

3. The apparatus according to claim 1, wherein said gas component is selected from the group consisting of one or more of iodine, bromine, ammonia, phenol and mixtures thereof.

4. The apparatus according to claim 1, wherein the contacting zones in the stripping parts and the absorption parts have packed layers.